United States Patent
Okunuki et al.

(10) Patent No.: US 7,034,895 B2
(45) Date of Patent: Apr. 25, 2006

(54) IMAGE DISPLAY APPARATUS, LIGHT QUANTITY CONTROL METHOD, AND STORAGE MEDIUM STORING PROGRAM THEREOF

(75) Inventors: Junichi Okunuki, Tokyo (JP); Atsushi Kuroda, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 547 days.

(21) Appl. No.: 10/316,001

(22) Filed: Dec. 11, 2002

(65) Prior Publication Data

US 2003/0112378 A1 Jun. 19, 2003

(30) Foreign Application Priority Data

Dec. 13, 2001 (JP) .............................. 2001-380125

(51) Int. Cl.
*H04N 5/14* (2006.01)
*H04N 5/57* (2006.01)
*H04N 5/74* (2006.01)

(52) U.S. Cl. ...................... 348/673; 348/674; 348/687; 348/777

(58) Field of Classification Search ................ 348/673, 348/674, 677, 678, 679, 687, 688, 777, 739; 358/519, 520; H04N 5/14, 5/202, 5/52, 5/57, H04N 5/66, 5/74
See application file for complete search history.

(56) References Cited

U.S. PATENT DOCUMENTS

| 5,406,305 A | 4/1995 | Shimomura et al. |
| 5,952,992 A | 9/1999 | Helms |
| 6,650,373 B1 * | 11/2003 | Ono et al. ................... 348/673 |

FOREIGN PATENT DOCUMENTS

| EP | 0 547 325 A2 | 6/1993 |
| EP | 1 251 479 A1 | 10/2002 |
| JP | H06-34946 A | 2/1994 |
| JP | H08-87250 A | 4/1996 |
| JP | H09-244548 A | 9/1997 |
| JP | H11-65531 A | 3/1999 |
| JP | 2000-330542 A | 11/2000 |
| JP | 2001-27890 A | 1/2001 |
| WO | WO 01/52228 A1 | 7/2001 |

* cited by examiner

*Primary Examiner*—Sherrie Hsia
(74) *Attorney, Agent, or Firm*—Sughrue Mion, PLLC

(57) ABSTRACT

A light quantity control by a user can be synchronized to an automatic light quantity control depending on a luminance level of an input video signal. An image display apparatus partially passes or reflects a light from a light source which can control light quantity and displays an image based on a video signal externally input, and has a predetermined scope of an output level corresponding to a scope of control of light quantity of the light source, and includes: a light quantity control unit having a predetermined scope of an output level corresponding to the scope of control of the light quantity of the light source, and for outputting a reference signal at a level arbitrarily set by a user; an APL detection circuit for detecting the average luminance level for one frame (or one field) of the video signal, and outputting an amplification coefficient depending on the detected average luminance level; a multiplier circuit for multiplying the amplification coefficient by a reference signal, and outputting a control signal which is the multiplication result; and a power circuit for controlling the light quantity of the light source according to the control signal.

7 Claims, 9 Drawing Sheets

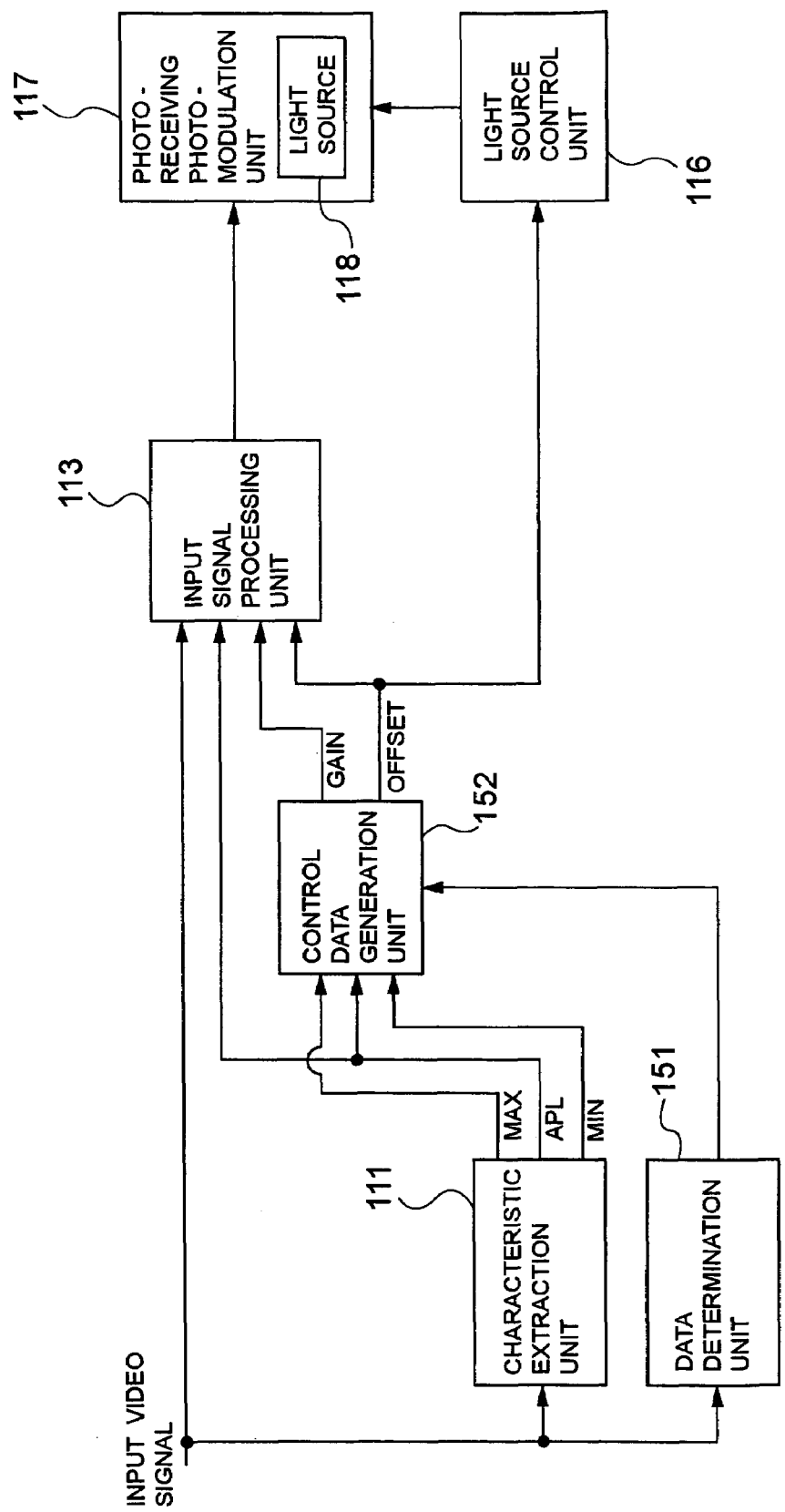

IMAGE DISPLAY APPARATUS, LIGHT QUANTITY CONTROL METHOD, AND STORAGE MEDIUM STORING PROGRAM THEREOF

BACKGROUND OF THE INVENTION

Field of the Invention

The present invention relates to an apparatus and a method of displaying an image by partially passing through or reflecting a light from a light source, and more specifically to an image display apparatus and a light quantity control method capable of controlling the light quantity of the light source.

An example of the image display apparatus described above can be a projector for projecting an enlarged image formed on a liquid crystal panel by illuminating the liquid crystal panel by the light from the light source. The projector can be a three-board liquid crystal projector or a single-board liquid crystal projector. For example, FIG. 11 shows an outline of a configuration of a single-board liquid crystal projector.

In FIG. 11, the liquid crystal projector includes a light source 200, a converging lens 201 for converging a light from the light source 200, a liquid crystal panel 202 illuminated by the light converged by the converging lens 201, and a projection lens 203 for projecting an image (transmission light) formed on the liquid crystal panel 202 on a screen 204 as an enlarged image. The liquid crystal panel 202 is a well-known color liquid crystal panel, and a color image is formed on the panel.

In the liquid crystal projector described above, an image is formed on the liquid crystal panel 202 according to the video signal input from external equipment (video equipment (a video tape recorder (VTR), a video camera, etc.)), and a formed image is displayed on the screen 204. Normally, the projector has the function of controlling the light quantity of the light source 200, and the user utilizes the function to, for example, set a displayed image at a visible brightness level depending on the brightness of the surroundings when the projector is activated.

Recently, to obtain a more visible image, there has been a suggestion to control the contrast or the light quantity of a displayed image depending on the luminance level of an input video signal. For example, there is the technology of obtaining desired contrast at a constant display luminance level by detecting the maximum luminance level (MAX) and the minimum luminance level (MIN) of an input video signal, lowering the contrast when the maximum amplitude obtained from these values is large, raising the contrast when it is small, detecting the average picture level (APL) of the input video signal, reducing the light quantity of the light source when the detected APL is higher than a predetermined reference luminance level, and increasing the light quantity of the light source when the detected APL is lower than the reference luminance level.

However, in the above mentioned case, the light quantity of the light source is also increased for the input video signal of a dark image mostly occupied by a black area in the entire displayed image. Therefore, there occurs an intensified black phenomenon that a black area appears bright. An 'intensified black phenomenon' is described below.

For example, when a black area (A) is displayed on the screen 204 using the liquid crystal projector shown in FIG. 11, the light from the light source 200 in the pixel area (B) of the liquid crystal panel 202 is shielded corresponding to the black area (A). However, it is actually impossible to completely shield the light from the light source 200 in the pixel area (B) of the liquid crystal panel 202. Therefore, a part of the light from the light source 200 reaches the black area (A) on the screen 204 after passing through the pixel area (B) of the liquid crystal panel 202, thereby allowing the black area (A) to appear brighter than the actual level. This is referred to as an intensified black phenomenon. The intensified black phenomenon is not a big problem when the light quantity of the light source 200 is small because the quantity of the light reaching the black area (A) is also small. However, when the light quantity from the light source 200 is not small, a large amount of light reaches the black area (A), thereby causing a visual problem.

Thus, various devices have been developed and suggested to solve the above mentioned problem of an intensified black phenomenon. For example, the image display apparatus disclosed by Japanese Patent Laid-Open Publication No. 2001-27890 is described below.

FIG. 12 is a block diagram of the configuration of the image display apparatus disclosed in the publication cited above. The image display apparatus includes a characteristic extraction unit 111, an input signal processing unit 113, a light source control unit 116, a photo-receiving photo-modulation unit 117 provided with a light source 118, a data determination unit 151, and a control data generation unit 152.

A video signal output from the video signal processing circuit of a television receiver or a computer device, etc. is supplied to each of the characteristic extraction unit (the feature detecting part) 111, the input signal processing unit 113, and the data determination unit 151. The characteristic extraction unit 111 detects each the maximum luminance level (MAX), the minimum luminance level (MIN), and the average picture level (APL) of an input video signal.

The input signal processing unit 113 includes a signal amplitude control unit for amplifying an input video signal up to the dynamic range width which is the scope of processing a signal by the input signal processing unit 113 with reference to the APL based on the gain value provided by the control data generation unit 152, and a DC level control unit for shifting the level of the amplified video signal to set it within the dynamic range width based on the offset value provided by the control data generation unit 152. The light source control unit 116 controls the light quantity of the light source 118 based on the offset value provided by the control data generation unit 152.

The data determination unit 151 extracts a bright area from the input video signals, determines whether or not the bright area is larger than a predetermined reference value, and outputs the determination result to the control data generation unit (the control data generating part) 152. The control data generation unit 152 obtains a gain value and an offset value from the MAX, MIN, and APL detected by the characteristic extraction unit 111, and changes the obtained offset value depending on the determination result of the data determination unit 151. Described below in brief is the process procedure of the control data generation unit 152.

In a normal operation, that is, when the data determination unit 151 determines that the bright area is larger than the reference value, the control data generation unit 152 obtains a gain value for amplification of the maximum amplitude of the input video signal up to the dynamic range width, and outputs the value to the signal amplitude control unit of the input signal processing unit 113. Then, the control data generation unit 152 obtains an offset value for assignment of a DC level shift amount to set the amplified video signal output from the signal amplitude control unit within the dynamic range, and outputs it to the DC level control unit of the input signal processing unit 113 and the light source control unit 116.

Upon receipt of such a determination result from the data determination unit 151 that the bright area is smaller than the reference value, the control data generation unit 152 changes the obtained offset value. Concretely, the control data generation unit 152 changes the DC level difference of the offset value such that the luminance level of the light source 118 can be lower.

The image display apparatus with the above mentioned configuration controls the input video signal having a bright area larger than a predetermined reference value by controlling the contrast by the amplification of the signal amplitude with reference to the APL, and by controlling the light quantity of the light source such that the APL of the amplified signal can match the APL of the signal before amplification. In this case, the control of the light quantity is normally performed such that the light quantity can be increased when the APL is small, and such that the light quantity can be reduced when the APL is large. Although an intensified black phenomenon occurs if the control of light quantity is applied as is to the input video signal of a dark image, the above mentioned image display apparatus controls the input video signal (dark image) smaller than a predetermined reference value for a bright area such that the light quantity of the light source 118 can be reduced in addition to the control of the contrast by the amplification of the signal amplitude with reference to the APL to avoid the intensified black phenomenon. Thus, the intensified black phenomenon can be successfully suppressed.

As explained above by referring to the projector shown in FIG. 11, the above mentioned image display apparatus normally has a function of controlling the light quantity so that the light quantity of a light source can be arbitrarily controlled, and the user can control the displayed image to set at a desired brightness level using the function of controlling the light quantity. To display a visible image to a user, it is desired that control of light quantity by the user cooperates with the automatic control of light quantity depending on the luminance level of the above mentioned input video signal. However, in the image display apparatus shown in FIG. 12, the cooperative operation is not performed. Normally, the control of light quantity by a user and the automatic control of light quantity depending on the luminance level of the input video signal are independently controlled. Therefore, when a circuit is designed for a cooperative operation between these systems, it is predicted that the circuit configuration becomes complicated and costly.

SUMMARY OF THE INVENTION

The present invention aims at solving the above mentioned problems, and providing an inexpensive image display apparatus and a light quantity control method capable of allowing the control of light quantity by a user and the automatic control of light quantity depending on the luminance level of an input video signal to cooperate with each other.

To attain the above mentioned objects, the image display apparatus according to the present invention includes a light source whose quantity can be controlled, displays an image based on a video signal externally input after partially passing through or reflecting a light from the light source, and includes: light quantity control means having a predetermined scope of an output level corresponding to the scope of control of the light quantity of the light source, and for outputting a reference signal at a level arbitrarily set by a user; level control means for detecting average brightness of the displayed image according to the video signal, and controlling the level of the reference signal output from the light quantity control means depending on the detected brightness; and control means for controlling the light quantity of the light source according to the signal controlled by the level control means.

In the above mentioned case, the level control means can be configured to lower the level of the reference signal when the detected brightness is low. In this case, the external video signal is input in a frame or field unit, and the level control means can include: average luminance level detection means for detecting an average luminance level of the video signal in the frame or the field unit, and for outputting an amplification coefficient depending on the detected average luminance level; and multiplier means for multiplying the video signal by the amplification coefficient output from the average luminance level detection means. Additionally, the level control means can further include gamma correction means for multiplying the amplification coefficient output from the average luminance level detection means by a gamma correction coefficient obtained from a predetermined gamma characteristic; and the multiplier means can multiply the reference signal by the correction coefficient obtained by multiplying the gamma correction coefficient.

The light quantity control method according to the present invention is used with an image display apparatus which has a light source whose quantity can be controlled, and which displays an image based on a video signal externally input after partially passing through or reflecting a light from the light source. The method includes: a first step of generating a reference signal at a level arbitrarily set by a user from a scope of a predetermined level corresponding to the scope of the control of the light quantity of the light source; a second step of detecting average brightness of the displayed image according to the video signal; a third step of controlling a level of the reference signal generated in the first step depending on the average brightness detected in the second step; and a fourth step of controlling the light quantity of the light source according to the signal whose level is controlled in the third step.

In the above mentioned case, the level control in the third step is to lower the reference signal when the average brightness of the image detected in the second step is set at a low light level.

An average luminance level for one frame or one field of the video signal externally input in a frame or a field unit is detected in the second step. The third step can include: a step of generating an amplification coefficient depending on the average luminance level of the detected video signal for one frame or one field; and a step of multiplying the reference signal by the generated amplification coefficient.

Furthermore, an average luminance level for one frame or one field of the video signal externally input in a frame or a field unit is detected in said second step. The third step can include: a step of generating an amplification coefficient depending on the average luminance level of the detected video signal for one frame or one field; a step of multiplying the generated amplification coefficient by a gamma correction coefficient obtained from a predetermined gamma characteristic; and a step of multiplying the reference signal by a correction coefficient obtained by multiplying the gamma correction coefficient.

According to the above mentioned present invention, level control is performed depending on an average brightness of an image on a reference signal arbitrarily set by the user, and the light quantity of a light source is controlled according to the level-controlled signal. Therefore, the control of light quantity by the user and the automatic control of light quantity can be cooperatively performed. Since the level control of the reference signal can be realized by a simple circuit formed of an integration circuit and a multiplier circuit, the circuit configuration is not complicated or costly.

Furthermore, according to the present invention, the level control is performed such that the level of the reference signal can be lowered when the average brightness of a displayed image is low. Therefore, the light quantity of the light source is reduced when the displayed image is dark, thereby reducing the occurrence of the intensified black phenomenon described above by referring to the conventional problems.

BRIEF DESCRIPTION OF THE DRAWINGS

FIG. 12 is a block diagram of an outline of a configuration of the image display apparatus described in Japanese Patent Laid-Open Publication No. 2001-27890.

DESCRIPTION OF THE PREFERRED EMBODIMENTS

The embodiments of the present invention will be described below by referring to the attached drawings.

(Embodiment 1)

Figure 1:
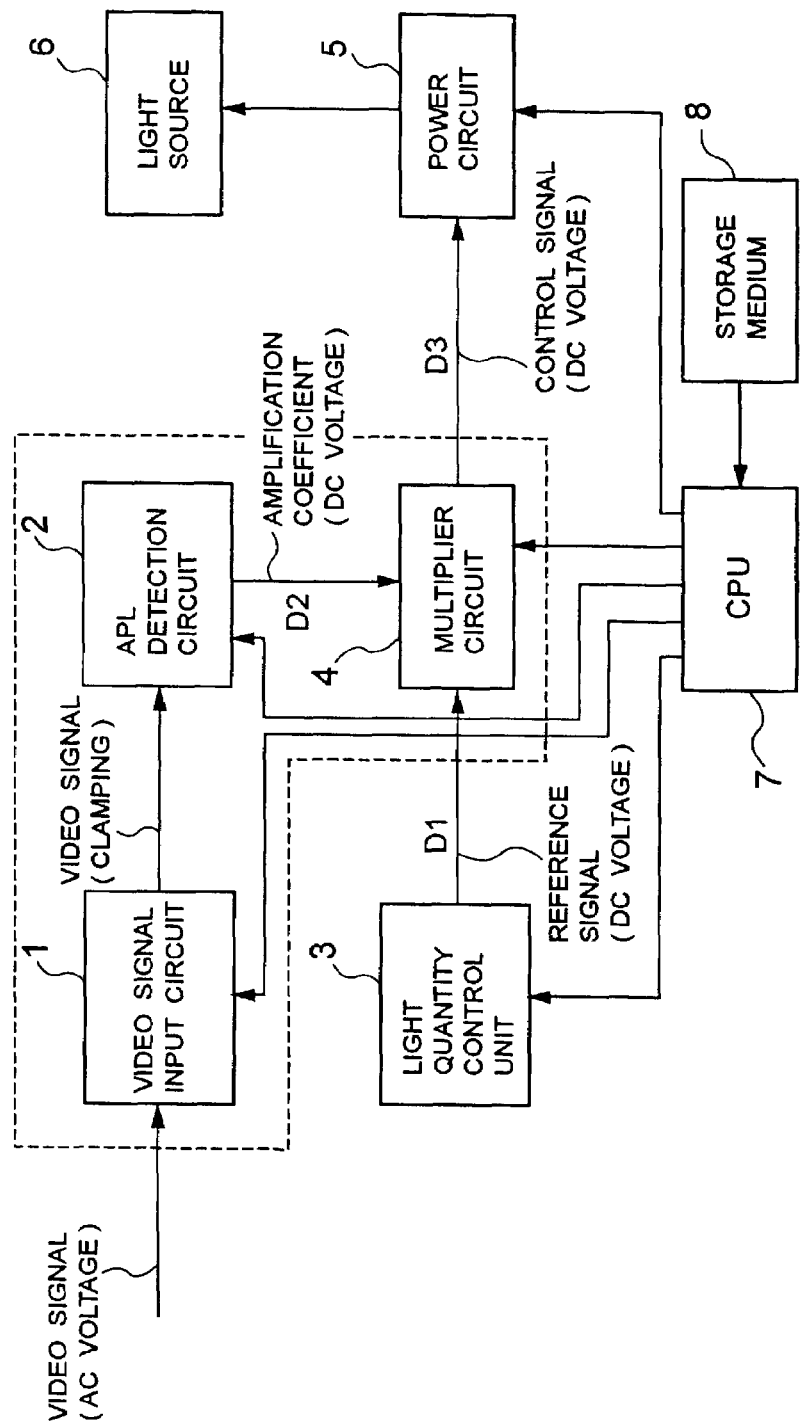
FIG. 1 is a block diagram of an outline of a configuration of an image display apparatus according to a first embodiment of the present invention.

FIG. 1 is a block diagram of an outline of a configuration of an image display apparatus according to a first embodiment of the present invention. The image display apparatus according to the present embodiment regenerates a video signal input from external equipment (video equipment, a computer device, etc.), and comprises: a light source 6 whose light quantity can be controlled; a light quantity control unit 3 which has a predetermined output level corresponding to the light quantity control of the light source 6, and outputs a reference signal D1 of a level arbitrarily set by a user; level control means (indicated by a frame in broken lines shown in FIG. 1) having a video signal input circuit 1, an APL detection circuit 2, and a multiplier circuit 4; a power circuit 5 for controlling the light quantity of the light source 6 according to a control signal D3 level-controlled by the level control means; a CPU (central processing unit) 7 for controlling the circuits 1, 2, 4, and 5, and the light quantity control unit 3; and a storage medium 8.

To make the explanation of the operations of each of the above mentioned components more easily understandable, described below in brief are the image displaying operations of the image display apparatus according to the present embodiment. Although not shown in FIG. 1, a well-known display device such as a liquid crystal panel, etc. is provided in a traveling direction of the light from the light source 6. By illuminating the display device with the light from the light source 6, an image is formed, and projected on the screen. The generation of an image in the display device is controlled by a drive circuit not shown in the attached drawings. Normally, a video signal input from external equipment is stored in image memory in a frame (or a field) unit, and a drive circuit controls a display device according to the video signal read from the image memory. By the control through the drive circuit, the display device forms an image in a frame (or a field) unit.

The video signal input circuit 1 comprises a well-known clamping circuit. The video signal input circuit 1 clamps a video signal input from external equipment in a frame (or a field) unit with a direct current (DC), and outputs the clamped signal to the APL detection circuit 2.

Figure 2:
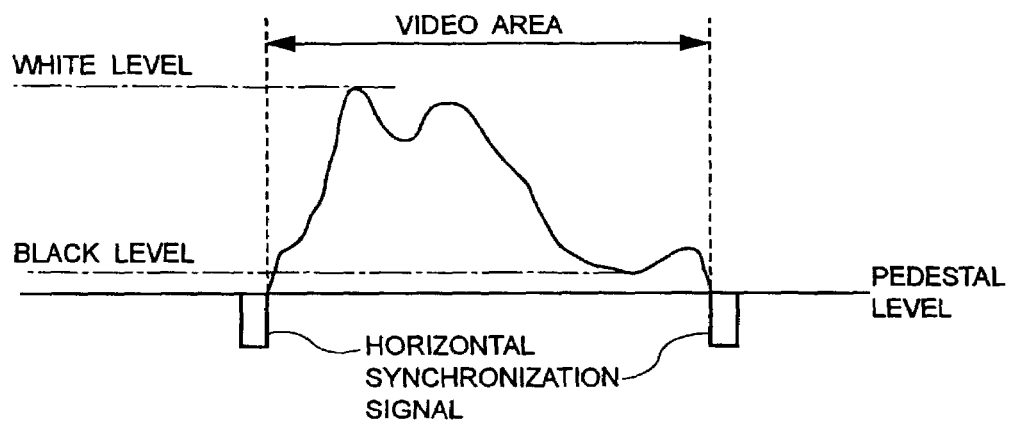
FIG. 2 shows a type of an example of a DC clamp.

FIG. 2 shows a type of an example of a DC clamp. The display device described above by referring to the displayed operations has a plurality of scanning lines, one frame (or field) of video signals input from the external equipment contain signals of a video area corresponding to each scanning line of the display device. A signal of each video area is sectioned by a horizontal synchronization signal corresponding to a new line, and the entire signals are sectioned by a vertical synchronization signal (not shown in the attached drawings) corresponding to a new page. The video signal shown in FIG. 2 is a signal in a video area corresponding to one scanning line, and the video signal input circuit 1 clamps the signal of the video area at a reference clamp level (in this embodiment, a pedestal level). The clamp by the video signal input circuit 1 is performed on each of the signals in the video area corresponding to each scanning line.

The APL detection circuit 2 extracts the luminance level of the video area for each of the signals of the video area corresponding to each scanning line which are DC-clamped by the video signal input circuit, obtains the average picture level (APL) of the luminance level of the video area in the entire video signals of one frame (or field), and outputs an amplification coefficient D2 (DC voltage) proportional to the obtained APL to the multiplier circuit 4. The range of the amplification coefficient D2 output from the APL detection circuit 2 is, for example, from 0 V to 1 V, and the obtained APL is converted within the scope in the APL detection circuit 2. These operations are, for example, realized using a well-known integrator circuit.

The light quantity control unit 3 outputs the reference signal D1 (DC voltage) corresponding to the set light quantity to the multiplier circuit 4, at the portion where the user sets the light quantity of the light source 6. The range of the reference signal D1 (DC voltage) output from the light quantity control unit 3 is, for example, 0 V to 10 V.

The multiplier circuit 4 multiplies the reference signal D1 from the light quantity control unit 3 by the amplification coefficient D2 from the APL detection circuit 2, and outputs to the power circuit 5 the control signal D3 (DC voltage) which is a multiplication result. The range of the control signal D3 is 0 V to 10 V.

The power circuit 5 controls the light quantity of the light source 6 according to the control signal D3 provided by the multiplier circuit 4. The power circuit 5 controls the output of the light source within the range from 0% to 100% depending on the range of the control signal D3 from 0 V to 10 V.

The light quantity controlling operation of the image display apparatus according to the present embodiment is described below by referring to the flowcharts shown in FIGS. 7 to 9.

(1) Controlling a Light Quantity by a User

A user controls the light quantity through the light quantity control unit 3 such that the brightness of an image displayed on the screen can be set at a desired brightness level. When the displayed image is set at the brightest level, the value of the reference signal D1 output from the light quantity control unit 3 is 10 V. When it is set at the lowest brightness level, the value of the reference signal D1 output from the light quantity control unit 3 is 0 V (refer to S1 shown in FIG. 7). The reference signal D1 from the light quantity control unit 3 is input into the multiplier circuit 4.

The output (OUT) of the light source 6 is represented by the following equation.

$$\text{OUT (proportional to } D3) = D1 \times D2$$

Therefore, for example, if the amplification coefficient D2 output from the APL detection circuit 2 is constant, the light quantity of the light source 6 changes with the value of the reference signal D1 from the light quantity control unit 3. That is, the control of the light quantity by the user is directly reflected by the change in light quantity of the light source 6.

(2) Automatic Control of Light Quantity

When the video signal is input into the video signal input circuit 1 from the external equipment in a frame (or a field) unit, the video signal input circuit 1 clamps the input video signal at a predetermined direct current level. Then, the APL detection circuit 2 obtains the APL of the luminance level of the video area according to the video signal DC-clamped in the video signal input circuit 1 (refer to S2 shown in FIG. 7), and inputs into the multiplier circuit 4 the amplification coefficient D2 corresponding to the obtained APL. If the APL is large, the value of the amplification coefficient D2 becomes large correspondingly (on condition 1 V or less). On the other hand, if the APL is small, then the value of the amplification coefficient D2 becomes small correspondingly (on condition 0 V or more). For example, if the video signal indicates a mostly bright image displayed on the display device, then the luminance level of the video signal is close to the white level (refer to FIG. 2) which is the brightest level over the entire video area of each scanning line. In this case, the APL detection circuit 2 outputs the amplification coefficient D2 close to the value of 1 V. On the other hand, when the video signal indicates a mostly dark image displayed on the display device, the luminance level of the video signal is close to the black level (refer to FIG. 2) which is the darkest level over the entire video area of each scanning line. In this case, the APL detection circuit 2 outputs the amplification coefficient D2 close to 0V. Thus, the darker an image is, the smaller value of the amplification coefficient D2 is output from the APL detection circuit 2.

Figure 7:
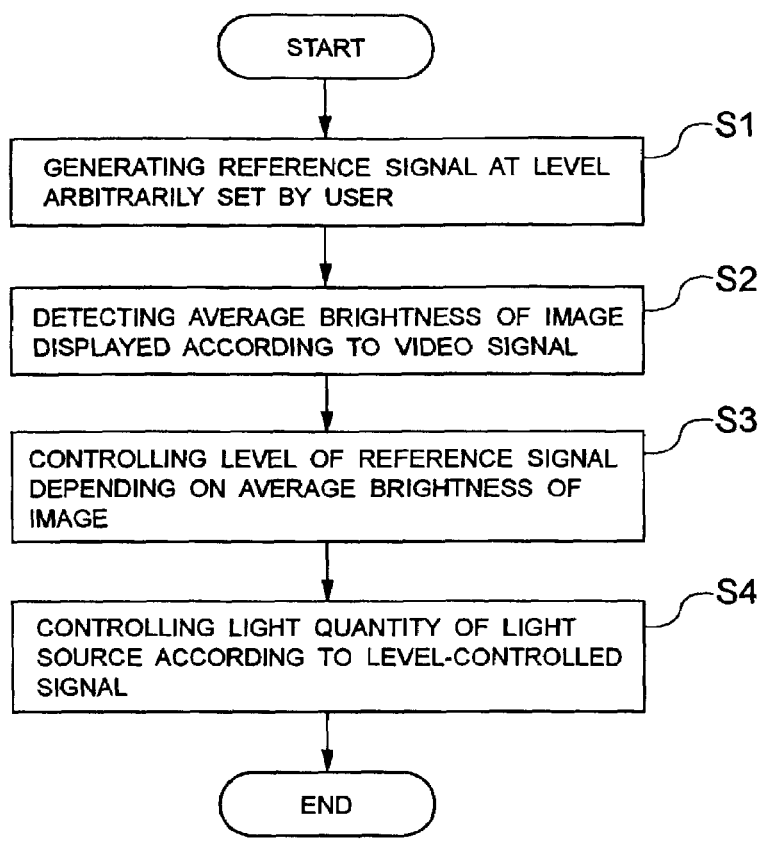
FIGS. 7, 8, and 9 are flowcharts of operations according to the first embodiment of the present invention.
Figure 8:
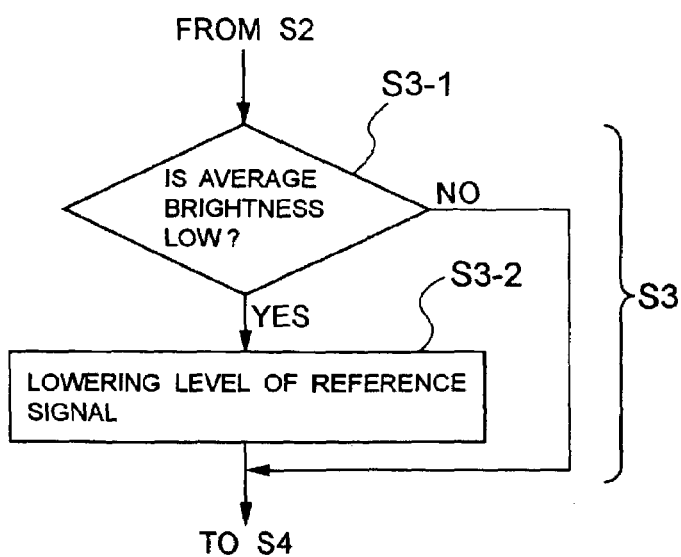

The multiplier circuit 4 multiplies the reference signal D1 input from the light quantity control unit 3 by the amplification coefficient D2 input from the APL detection circuit 2, and the control signal D3 which is the multiplication result is input into the light quantity control unit 3 (refer to S3 shown in FIG. 7). Since the darker the image is, the smaller the value of the amplification coefficient D2 input from the APL detection circuit 2 becomes, the value of the control signal D3 of the multiplier circuit 4 also becomes small (refer to S3-1 and S3-2 shown in FIG. 8).

As described above in "(1) Controlling a light quantity by a user," the output (OUT) of the light source 6 is represented by the following equation.

$$\text{OUT (proportional to } D3) = D1 \times D2$$

Therefore, for example, when the value of the reference signal D1 from the light quantity control unit 3 is constant, the light quantity of the light source 6 changes with the value of the amplification coefficient D2 input from the APL detection circuit 2. The value of the amplification coefficient D2 output from the APL detection circuit 2 is the smaller if an image is the darker. Therefore, the light quantity of the light source 6 also becomes the smaller if the image is the darker (refer to S4 shown in FIG. 7).

Figure 3:
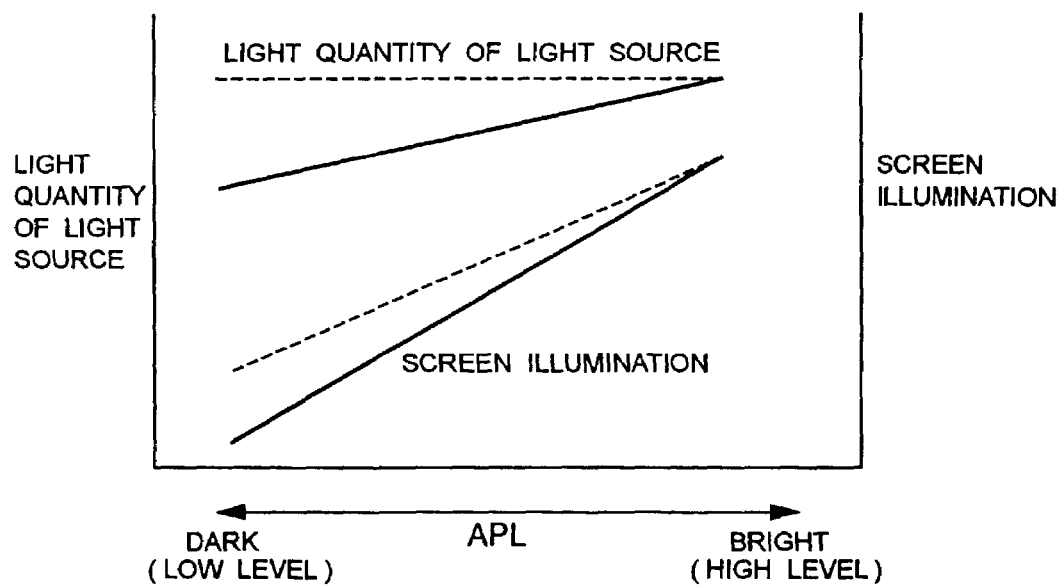
FIG. 3 shows a comparison result between the image display apparatus having no automatic light quantity control facility (constant light quantity) and the image display apparatus shown in FIG. 1 with regard to the relationship between the light quantity of a light source and a screen illumination.

FIG. 3 shows a comparison result between the image display apparatus having no automatic light quantity control facility (constant light quantity) and the image display apparatus with regard to the relationship between the light quantity of a light sources and a screen illumination according to the present embodiment. In FIG. 3, the vertical axes indicate the light quantity of a light source and the screen illumination, and the horizontal axis indicates the brightness (level of a video signal). Furthermore, the relationship between the light quantity of a light source and the screen illumination in the image display apparatus having no automatic light quantity control facility (constant light quantity) is shown by broken lines, and the relationship between the light quantity of a light source and the screen illumination in the image display apparatus in the present embodiment is shown by solid lines.

As shown in FIG. 3, in the image display apparatus according to the present embodiment, when the APL of a video signal is lowered, the light quantity of the light source 6 is reduced. As a result, the screen illumination is further reduced as compared with the case in which the light quantity of a light source is constant. Thus, in the image display apparatus according to the present embodiment, the automatic light quantity control depending on the APL of an input video signal reduces the light quantity of the light source 6 when the video signal indicates a dark image, and thereby an intensified black phenomenon can be avoided. Additionally, the automatic light quantity control is performed based on the reference signal D1 light-quantity-controlled by a user, and the amplification of the light quantity of the light source 6 using the amplification coefficient D2 is not changed by the light quantity control by the user.

Figure 9:
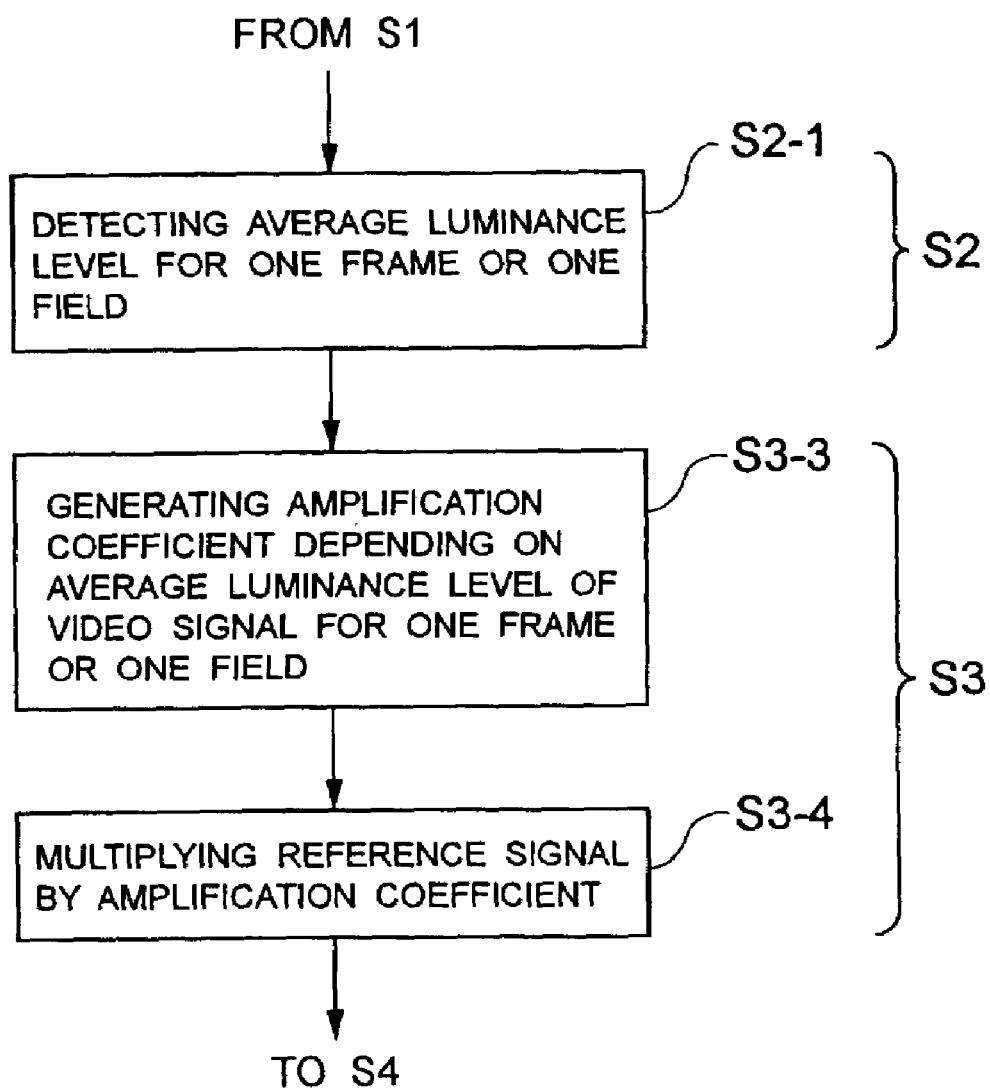

The above mentioned automatic light quantity control is performed in a frame (or field) unit, and is synchronized with the image generation by the display device (refer to S2-1, S3-3, and S3-4 shown in FIG. 9). In this synchronization, an internal synchronization signal is practically generated in the image display apparatus according to the vertical synchronization signal of the video signal input from external equipment. According to the internal synchronization signal, the image generation in the display device (to be more concrete, the reading operation of a video signal from image memory) and the light quantity control of the light source 6 by the power circuit 5 are synchronized.

For simple explanation of the light quantity control, the range of the reference signal D1 is set to 1 V to 10 V, the range of the amplification coefficient D2 is set to 0 V to 1 V, the range of the control signal D3 is set to 0 V to 10 V in the above mentioned explanation. However, the present invention is not limited to these ranges. If the range of the control signal D3 is set corresponding to the output range of the light quantity, and the multiplication result of the reference signal D1 and the amplification coefficient D2 is within the set range of the control signal D3, then the values of D1 to D3 can be arbitrarily set.

(Embodiment 2)

In the image display apparatus according to the above mentioned first embodiment, the contrast can be further improved by applying to the amplification coefficient to be input to the multiplier circuit the gamma correction having a predetermined gamma characteristic such that the light quantity can be reduced only when the APL is low. Furthermore, a configuration of directly inputting a digital video signal for protection against the deterioration in the quality of a transmission image is also requested. Described below will be an image display apparatus capable of making a gamma correction, and automatically controlling the quantity of light on the inputs of an analog video signal and a digital video signal.

Figure 4:
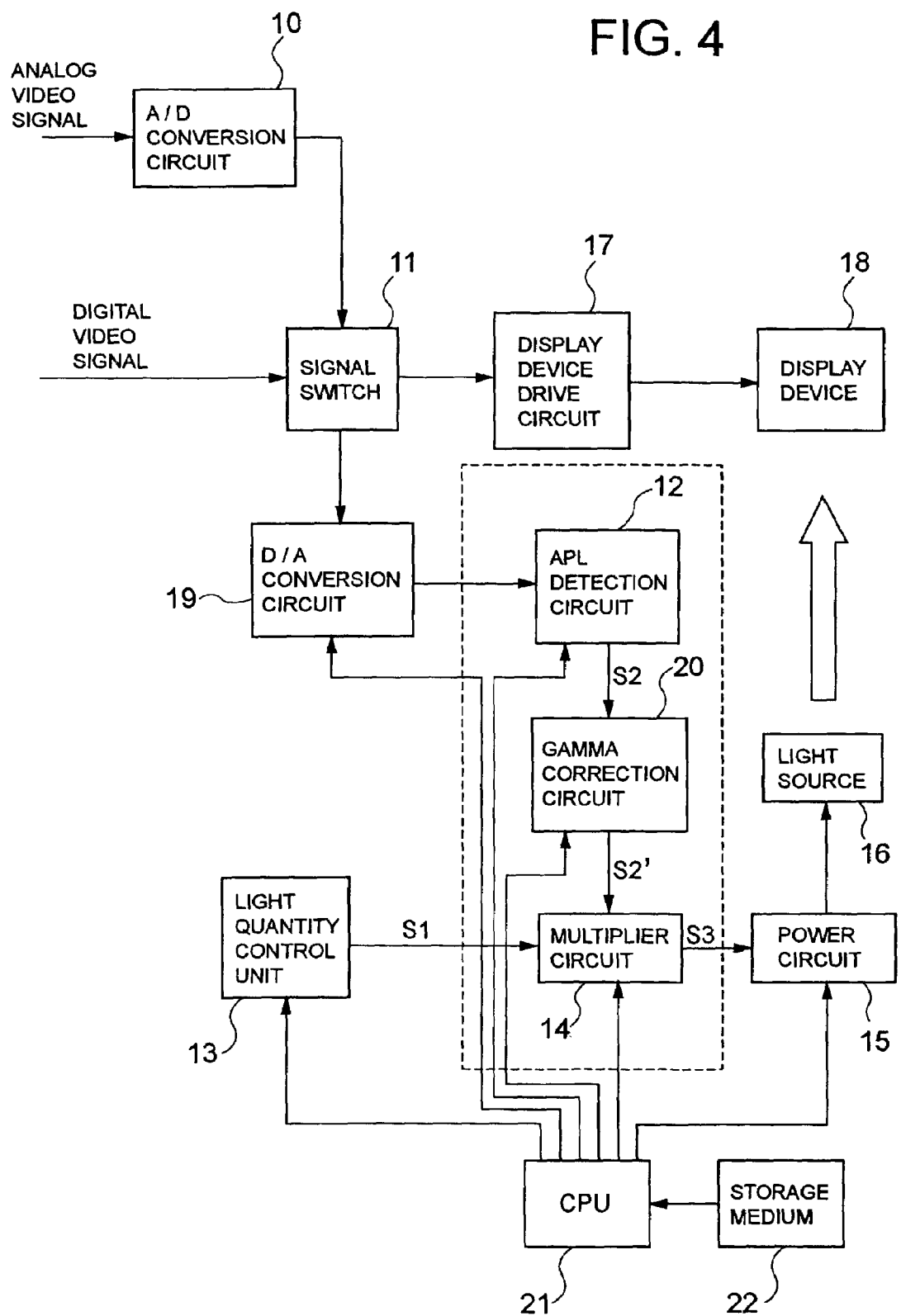
FIG. 4 is a block diagram of an outline of a configuration of an image display apparatus according to a second embodiment of the present invention.

FIG. 4 is a block diagram of an outline of a configuration of an image display apparatus according to a second embodiment of the present invention. The image display apparatus comprises an A/D conversion circuit 10, a signal switch 11, an APL detection circuit 12, a light quantity control unit 13, a multiplier circuit 14, a power circuit 15, a light source 16, a display device drive circuit 17, a display device 18, a D/A conversion circuit 19, a gamma correction circuit 20, a CPU 21 for controlling the circuits 12, 14, 15, 19, and 20, the light quantity control unit 13, and a storage medium 22. The level control means comprises the APL detection circuit 12, the multiplier circuit 14, and the gamma correction circuit 20.

The A/D conversion circuit 10 A/D converts an externally input analog video signal. The signal switch 11 receives at one input terminal the video signal A/D converted by the A/D conversion circuit 10, receives at the other input terminal an externally input digital video signal, and outputs by priority the input selected and set by the user. For example, the signal switch 11 allows the user to select and set any of the analog and digital inputs. When an analog input is set, the video signal A/D converted by the A/D conversion circuit 10 is output by priority. When a digital input is set, the externally input digital video signal is output as is by priority. The output of the A/D conversion circuit 10 is input into each of the display device drive circuit 17 and the D/A conversion circuit 19.

The display device drive circuit 17 controls image generation in the display device 18 according to the video signal provided by the A/D conversion circuit 10. The display device 18 is, for example, a liquid crystal panel provided with a plurality of scanning lines. When it is illuminated by the light from the light source 16, an image is formed on the panel, and the formed image is projected onto a screen. The display device drive circuit 17 controls the formation of the image on the liquid crystal panel according to the input video signal as in the above mentioned image displaying operation according to the first embodiment of the present invention.

The D/A conversion circuit 19 D/A converts the video signal (digital) input from the signal switch 11. The video signal (analog) D/A converted by the D/A conversion circuit 19 is input into the APL detection circuit 12. The APL detection circuit 12 is basically the same as the APL detection circuit 2 shown in FIG. 1, but includes a clamping circuit of the video signal input circuit 1. The APL detection circuit 12 extracts the luminance level of a video area for each signal of the video area corresponding to each scanning line of the display device 18 included in the video signal (analog) of one frame (or field) input from the D/A conversion circuit 19, obtains the average picture level (APL) of the luminance level of the video area in the entire video signals in one frame (or field), and inputs to the gamma correction circuit 20 a signal S2 (corresponding to the amplification coefficient D2 shown in FIG. 1) proportional to the obtained APL.

The gamma correction circuit 20 adds a predetermined gamma correction (gray-scale correction) to the signal S2 input from the APL detection circuit 12. Practically, the gamma correction circuit 20 multiplies the signal S2 input from the APL detection circuit 12 by a predetermined gamma correction coefficient. The gamma correction coefficient depends on the value of the APL detected by the APL detection circuit 12.

Figure 5:
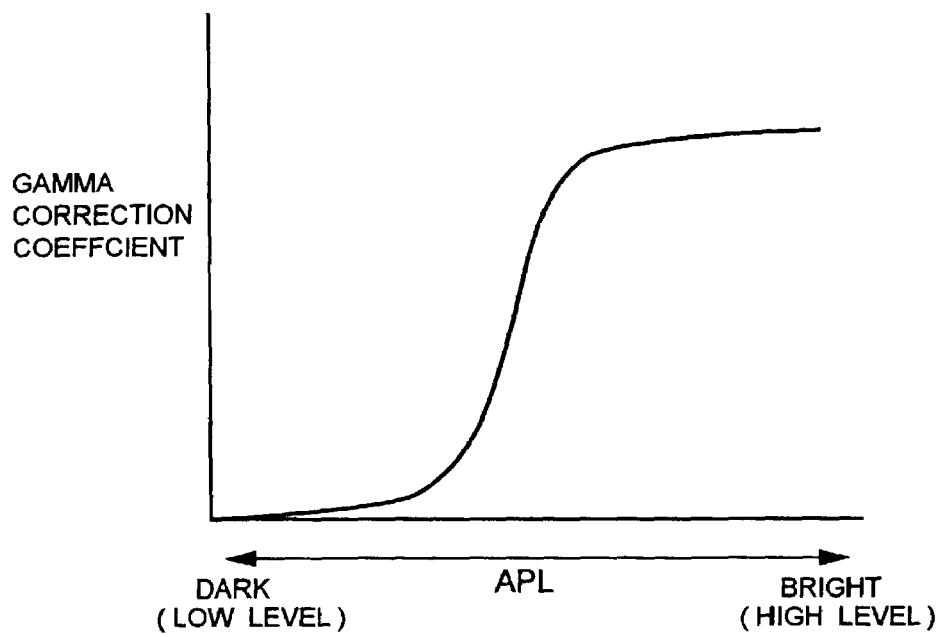
FIG. 5 shows a relationship between a gamma correction coefficient and an APL.

For one example, FIG. 5 shows a relationship between a gamma correction coefficient and an APL. In FIG. 5, the horizontal axis indicates the value of an APL, and the vertical axis indicates the value of a gamma correction coefficient. The gamma correction coefficient suddenly rises in the area having a value of the APL at an intermediate level, and expressed as a curve rising toward right. Upon receipt of the signal S2 from the APL detection circuit 12, the gamma correction circuit 20 obtains a gamma correction coefficient depending on the APL corresponding to the input signal S2 according to the curve shown in FIG. 5, multiplies the input signal S2 by the obtained gamma correction coefficient, and supplies the result as a signal S2' to one terminal of the multiplier circuit 14.

The light quantity control unit 13, the multiplier circuit 14, the power circuit 15, and the light source 16 are basically the same as those shown in FIG. 1. However, the multiplier circuit 14 receives at one input terminal the signal S2' from the gamma correction circuit 20, receives at the other input terminal a signal S1 (corresponding to the reference signal D1 shown in FIG. 1) from the light quantity control unit 13, and inputs a result of multiplying these inputs as a control signal S3 (corresponding to the control signal D3 shown in FIG. 1) to the power circuit 15.

Figure 10:
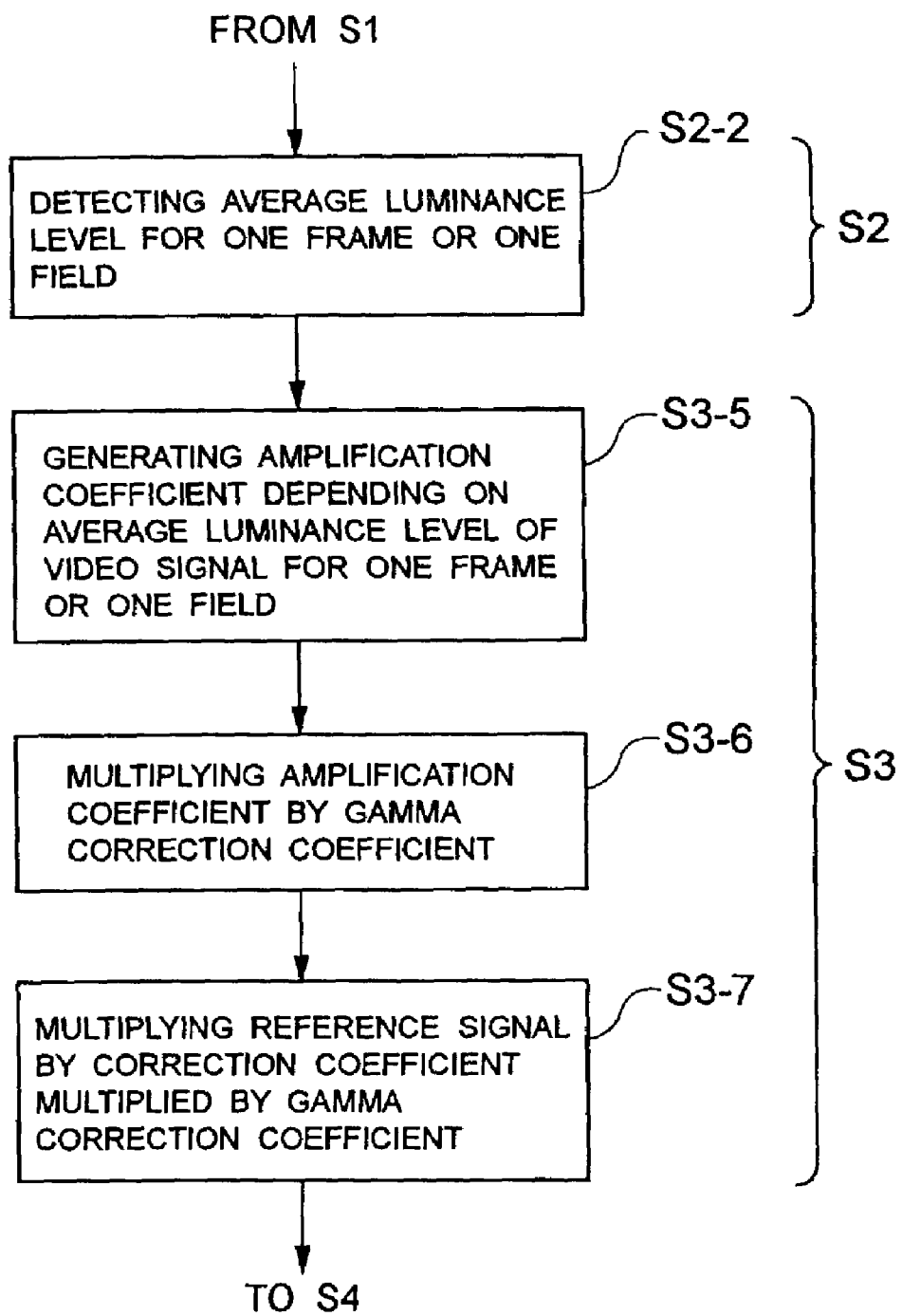
FIG. 10 is a flowchart of the operation according to the second embodiment.
Figure 11:
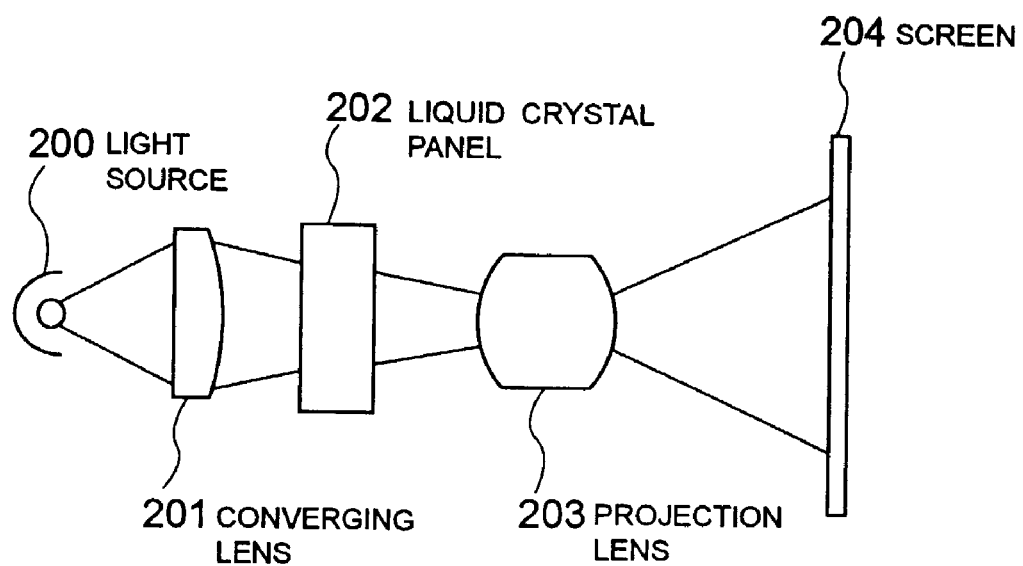
FIG. 11 shows an outline of a configuration of a single-board liquid crystal projector.

Described below by referring to the flowchart shown in FIG. 10 is a light quantity controlling operation of the image display apparatus according to the present embodiment.

The light quantity control by a user is the same as in the case according to the above mentioned first embodiment, and the explanation of the control is omitted here. That is, described below is the automatic light quantity control depending on the luminance level of an input video signal.

(1) Regenerating an Analog Video Signal:

An externally input analog video signal is first A/D converted by the A/D conversion circuit 10, and is then input into the signal switch 11. The signal switch 11 receives in advance a selected and set analog input by the user, and a video signal (digital) input from the A/D conversion circuit 10 is provided for each of the display device drive circuit 17 and the D/A conversion circuit 19.

Upon receipt of the video signal (digital) from the signal switch 11, the display device drive circuit 17 controls the formation of an image on the display device 18 according to the input video signal. The control of the formation of an image by the display device drive circuit 17 is performed in synchronization with the light quantity control described below.

Upon receipt of the video signal (digital) from the signal switch 11, the D/A conversion circuit 19 D/A converts the input video signal (digital), and inputs it into the APL detection circuit 12. Upon receipt of the D/A converted video signal (analog) from the D/A conversion circuit 19, the APL detection circuit 12 computes the APL of the input video signal (analog) (refer to S2-2 shown in FIG. 10), and inputs into the gamma correction circuit 20 the signal S2 proportional to the video signal.

Upon receipt of the signal S2 from the APL detection circuit 12, the gamma correction circuit 20 multiplies the input signal S2 by a predetermined gamma correction coefficient (amplification coefficient S2') (refer to S3-6 shown in FIG. 10), and inputs the result, into the multiplier circuit 14. The multiplier circuit 14 receives the reference signal S1 from the light quantity control unit 13, and inputs into the power circuit 15 the control signal S3 obtained by multiplying the reference signal S1 by the amplification coefficient S2' received from the gamma correction circuit 20 (refer to S3-7 shown in FIG. 10). The darker the video signal is, the smaller the value of the amplification coefficient S2' input from the gamma correction circuit 20 becomes, thereby obtaining the smaller value of the control signal S3 from the multiplier circuit 14.

The output (OUT) of the light source 16 is represented by the following equation.

$$\text{OUT (proportional to } S3) = S1 \times S2'$$

Therefore, for example, when the value of the reference signal S1 from the light quantity control unit 13 is constant, the light quantity of the light source 16 changes with the value of the amplification coefficient S2' input into the multiplier circuit 14 (refer to S4 shown in FIG. 7).

Figure 6:
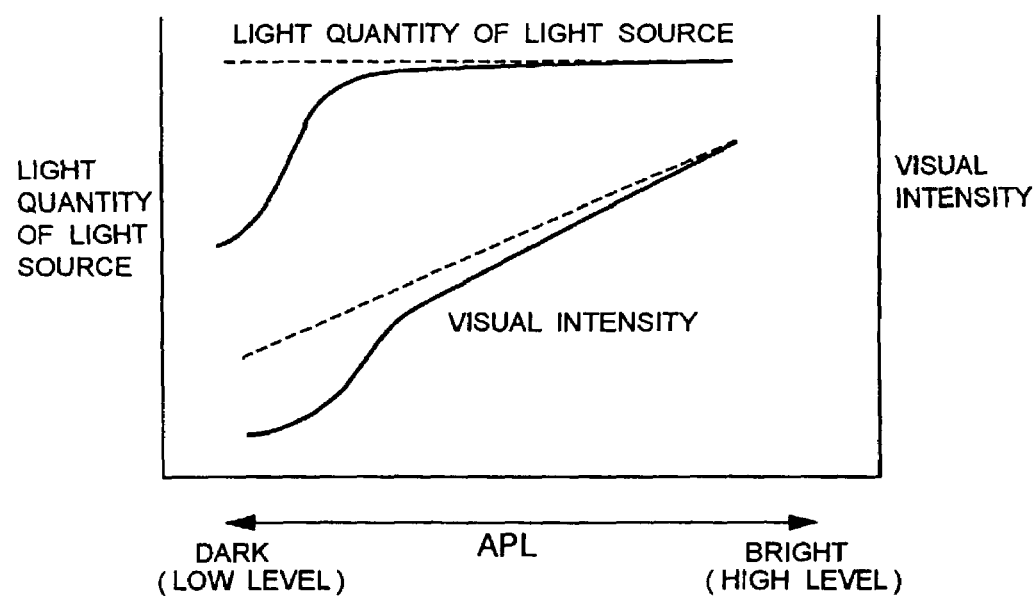
FIG. 6 shows a comparison result between the image display apparatus having no automatic light quantity control facility (constant light quantity) and the image display apparatus shown in FIG. 4 with regard to the relationship between the light quantity of a light source and a screen illumination.

FIG. 6 shows a comparison result between the image display apparatus having no automatic light quantity control facility (constant light quantity) and the image display apparatus according to the present embodiment with regard to the relationship between the light quantity of a light source and a visual luminance (screen illumination). In FIG. 6, the vertical axes respectively indicate the light quantity of a light source and the visual luminance (screen illumination), and the horizontal axis indicates the brightness (level of a video signal) of the display screen. The broken line indicates the relationship between the light quantity of a light source and the visual luminance in the image display apparatus having no automatic light quantity control facility (constant light quantity), and the solid line indicates the relationship between the light quantity of a light source and the visual luminance in the image display apparatus according to the present embodiment.

As shown in FIG. 6, when the APL of a video signal is lower than a normal value in the image display apparatus according to the present embodiment, the light quantity of the light source 16 is reduced, and the visual luminance (screen illumination) is further lowered as compared with the case in which the light quantity of a light source is constant. Thereby, the intensified black phenomenon can be avoided.

According to the above mentioned first embodiment of the present invention, the amplification coefficient D2 input into the multiplier circuit is proportional to the value of the APL from the APL detection circuit. Therefore, the light quantity of a light source changes linearly (refer to FIG. 3). According to the present embodiment, the amplification coefficient S2' input into the multiplier circuit 14 is obtained by multiplying the APL from the APL detection circuit 12 by a predetermined gamma correction coefficient. Therefore, the value of the amplification coefficient S2' can be small only when the APL is low. Therefore, the light quantity of the light source 16 is lowered only when the value of the APL of the input video signal is low. The automatic light quantity control according to the present embodiment is also performed with reference to the reference signal S1 whose light quantity is controlled by the user, and the amplification of the light quantity of the light source 16 by the amplification coefficient S2' is not changed although the user tries to control the quantity of light.

(2) Regenerating a Digital Video Signal:

An externally input digital video signal is input into the signal switch 11. The signal switch 11 receives in advance a selected and set digital input by the user, and a digital video signal externally input is provided as is for each of the display device drive circuit 17 and the D/A conversion circuit 19. Thereafter, the control of the formation of an image by the display device drive circuit 17 and the light quantity control of the light source 16 by the power circuit 15 are likewise performed as in the above mentioned "(1) Regenerating an analog video signal".

Also in the image display apparatus according to the present embodiment, as in the case according to the above mentioned first embodiment, the image formation control is synchronized to the automatic light quantity control. Furthermore, the reference signal S1, the signal S2, and the control signal S3 can be set to the similar ranges of the reference signal D1, the amplification coefficient D2, and the control signal D3. In this case, it is desired that the gamma correction coefficient has the maximum value of 1.

(Embodiment 3)

Then, described below will be a storage medium storing a program. A storage medium 8 shown in FIG. 1 stores programs shown in the flowchart in FIGS. 7 to 9. The CPU 7 shown in FIG. 1 controls the video signal input circuit 1, the APL detection circuit 2, the light quantity control unit 3, the multiplier circuit 4, and the power circuit 5 according to the programs. Since the contents of the control are described above, the explanation of them is omitted here.

Similarly, the storage medium 22 shown in FIG. 4 stores the programs shown in the flowcharts in FIGS. 7 and 10. The CPU 21 shown in FIG. 4 controls the APL detection circuit 12, the light quantity control unit 13, the multiplier circuit 14, the power circuit 15, the D/A conversion circuit 19, and the gamma correction circuit 20 according to the programs. Since the contents of the control are described above, the explanation of them is omitted here.

As described above, according to the present invention, the intensified black phenomenon can be avoided with a simple circuit configuration, and the light quantity control by a user can be synchronized to the automatic light quantity control depending on the luminance level of an input video signal. Therefore, there is such effect that the user can be provided with a visible and high contrast image.

What is claimed is:

1. An image display apparatus which has a light source whose quantity can be controlled, and displays an image based on a video signal externally input after partially passing through or reflecting a light from the light source, comprising:

light quantity control means having a predetermined scope of an output level corresponding to a scope of control of light quantity of the light source, and for outputting a reference signal at a level arbitrarily set by a user;

level control means for detecting an average brightness of the displayed image according to the video signal, and for controlling a level of the reference signal output from said light quantity control means depending on the detected brightness; and control means for controlling light quantity of the light source according to the signal controlled by said level control means;

wherein said level control means lowers the level of the reference signal when the detected brightness is low;

wherein said external video signal is input in a frame or field unit; and said level control means comprises;

average luminance level detection means for detecting an average luminance level of the video signal in said frame or said field unit, and outputting an amplification coefficient depending on the detected average luminance level; and multiplier means for multiplying the reference signal by an amplification coefficient output from said average luminance level detection means.

2. The image display apparatus according to claim 1, wherein said level control means further comprises gamma correction means for multiplying the amplification coefficient output from said average luminance level detection means by a gamma correction coefficient obtained from a predetermined gamma characteristic; and said multiplier means multiplies the reference signal by the correction coefficient obtained by multiplying said gamma correction coefficient.

3. An image display apparatus which has a light source whose quantity can be controlled, and displays an image based on a video signal externally input after partially passing through or reflecting a light from the light source, comprising:

light quantity control means having a predetermined scope of an output level corresponding to a scope of control of light quantity of the light source, and for outputting a reference signal at a level arbitrarily set by a user;

level control means for detecting an average brightness of the displayed image according to the video signal, and for controlling a level of the reference signal output from said light quantity control means depending on the detected brightness; and control means for controlling light quantity of the light source according to the signal controlled by said level control means;

wherein it is so constituted that a digital video signal and an analog video signal can be externally input; and said apparatus further comprises:

A/D conversion means for A/D converting said analog video signal;

signal switch means which is provided with said digital video signal at one input terminal, and said A/D converted digital video signal at another input terminal, and outputs by priority a digital video signal provided at one of the input terminals selected and set by a user; and D/A conversion means for D/A converting the digital video signal output from said signal switch means, and said level control means detects average brightness of an image from said D/A converted analog video signal.

4. A light quantity control method for use with an image display apparatus which has a light source whose quantity can be controlled, and which displays an image based on a video signal externally input after partially passing through or reflecting a light from the light source, comprising:

a first step of generating a reference signal at a level arbitrarily set by a user from a scope of a predetermined level corresponding to a scope of control of light quantity of said light source;

a second step of detecting average brightness of said displayed image according to said video signal;

a third step of controlling a level of the reference signal generated in said first step depending on the average brightness detected in said second step; and a fourth step of controlling light quantity of the light source according to the signal whose level is controlled in said third step;

wherein the level control in said third step is to lower the reference signal when the average brightness of the image detected in said second step is set at a low light level; and wherein an average luminance level for one frame or one field of the video signal externally input in a frame or a field unit is detected in said second step; and said third step comprises:

a step of generating an amplification coefficient depending on the average luminance level of said detected video signal for one frame or one field; and a step of multiplying the reference signal by said generated amplification coefficient.

5. A light quantity control method for use with an image display apparatus which has a light source whose quantity can be controlled, and which displays an image based on a video signal externally input after partially passing through or reflecting a light from the light source, comprising:

a first step of generating a reference signal at a level arbitrarily set by a user from a scope of a predetermined level corresponding to a scope of control of light quantity of said light source;

a second step of detecting average brightness of said displayed image according to said video signal;

a third step of controlling a level of the reference signal generated in said first step depending on the average brightness detected in said second step; and a fourth step of controlling light quantity of the light source according to the signal whose level is controlled in said third step;

wherein the level control in said third step is to lower the reference signal when the average brightness of the image detected in said second step is set at a low light level; and wherein an average luminance level for one frame or one field of the video signal externally input in a frame or a field unit is detected in said second step; and said third step comprises the steps of:

generating an amplification coefficient depending on the average luminance level of the detected video signal for one frame or one field;

multiplying the generated amplification coefficient by a gamma correction coefficient obtained from a predetermined gamma characteristic; and multiplying the reference signal by a correction coefficient obtained by multiplying the gamma correction coefficient.

6. A storage medium storing a program used to direct a computer to execute a light quantity control method for use with an image display apparatus which has a light source whose quantity can be controlled, and which displays an image based on a video signal externally input after partially passing through or reflecting a light from the light source, comprising:

a first step of generating a reference signal at a level arbitrarily set by a user from a scope of a predetermined level corresponding to a scope of control of light quantity of said light source;

a second step of detecting average brightness of said displayed image according to said video signal;

a third step of controlling a level of the reference signal generated in said first step depending on the average brightness detected in said second step; and a fourth step of controlling light quantity of said light source according to the signal whose level is controlled in said third step;

wherein the level control in said third step is to lower the reference signal when the average brightness of an image detected in said second step is set at a low light level; and wherein an average luminance level for one frame or one field of the video signal externally input in a frame or a field unit is detected in said second step, and said third step comprises the steps of generating an amplification coefficient depending on the average luminance level of said detected video signal for one frame or one field; and multiplying the reference signal by said generated amplification coefficient.

7. A storage medium storing a program used to direct a computer to execute a light quantity control method for use with an image display apparatus which has a light source whose quantity can be controlled, and which displays an image based on a video signal externally input after partially passing through or reflecting a light from the light source, comprising:

a first step of generating a reference signal at a level arbitrarily set by a user from a scope of a predetermined level corresponding to a scope of control of light quantity of said light source;

a second step of detecting average brightness of said displayed image according to said video signal;

a third step of controlling a level of the reference signal generated in said first step depending on the average brightness detected in said second step; and a fourth step of controlling light quantity of said light source according to the signal whose level is controlled in said third step;

wherein the level control in said third step is to lower the reference signal when the average brightness of an image detected in said second step is set at a low light level; and wherein an average luminance level for one frame or one field of the video signal externally input in a frame or a field unit is detected in said second step, and said third step comprises the steps of generating an amplification coefficient depending on the average luminance level of said detected video signal for one frame or one field;

multiplying said generated amplification coefficient by a gamma correction coefficient obtained from a predetermined gamma characteristic; and multiplying the reference signal by a correction coefficient obtained by multiplying the gamma correction coefficient.

* * * * *